Jan. 10, 1950 A. OSTERBACK 2,493,895
AUTOMATIC CONTROL FOR WIND-DRIVEN PROPELLERS
Filed May 9, 1945
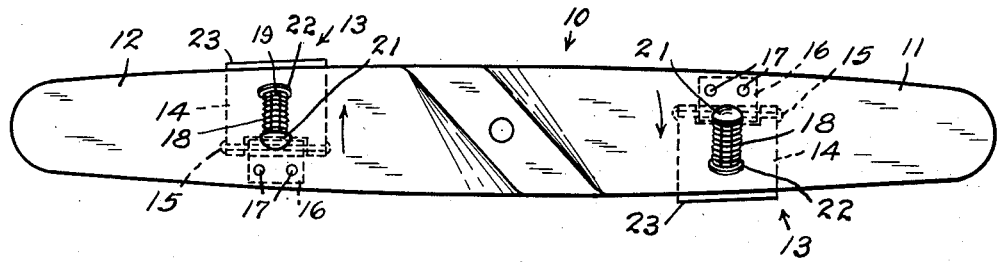
Fig. 1
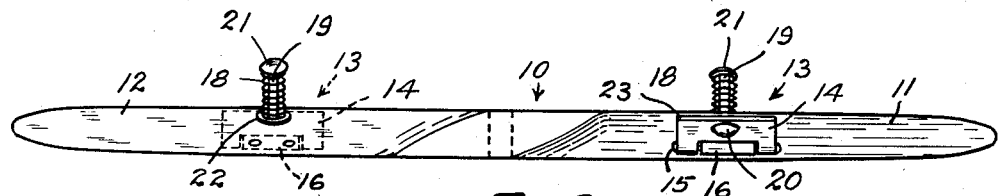
Fig. 2
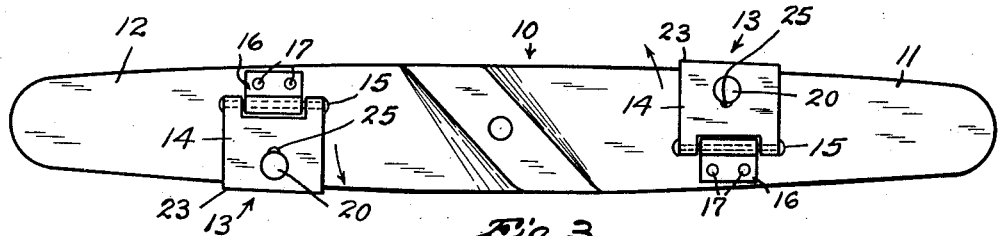
Fig. 3
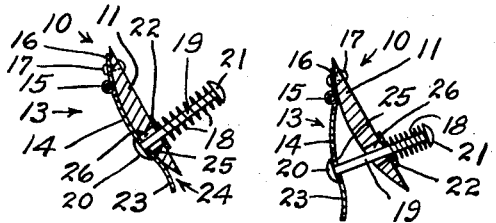
Fig. 4  Fig. 5
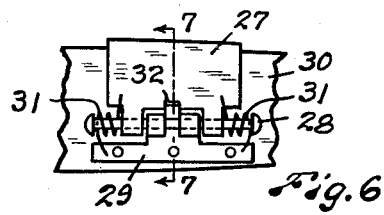
Fig. 6
Fig. 7
INVENTOR.
Alvin Osterback
BY
Arnold and Mathis
ATTORNEYS Patented Jan. 10, 1950

2,493,895

UNITED STATES PATENT OFFICE 2,493,895

AUTOMATIC CONTROL FOR WIND-DRIVEN PROPELLERS

Alvin Osterback, Sand Point, Alaska

Application May 9, 1945, Serial No. 592,886

5 Claims. (Cl. 170—75)

My invention relates to a method of automatic control for a wind driven propeller and apparatus therefor. More particularly, my invention relates to a method and apparatus therefor to reduce the speed of rotation of a propeller employed as a windmill when the wind increases in velocity beyond a certain predetermined magnitude.

Windmills as a source of power have been and are still of great importance for many special uses. One such example is that of charging electric batteries, particularly in places where electric power lines are absolutely not available or are not practically available for one reason or another.

In defining my invention I will describe the same as applied to the problems peculiar to charging batteries by a wind powered mill but be it noted that the application of my invention is not to be so limited but is to be co-extensive with fields where like principles are involved.

In isolated sections, as on Alaskan islands, the windmill is a most important source of power. However, charging an electric battery involves maintaining the charging voltage within a certain range for a given battery in order that damage thereto by an excessive voltage may be avoided. As well known, the wind velocity may vary greatly. It may be very low on certain days and therefore the blades of the windmill must be capable of operating at their utmost efficiency. At other times the velocity of the wind may be of storm velocity character and would produce a voltage such as to destroy the battery, if not wreck the windmill itself.

A primary object of my invention is to provide a simple, reliable, regulated source of power in the form of a controlled propeller to act as a windmill for charging an electric battery. It is my purpose to provide a control for the blade of the propeller which will directly regulate the effect of the wind upon the propeller.

A further object of my invention is to provide the blade of a propeller with a braking mechanism which automatically reduce the velocity of rotation within such limits as will produce a charging voltage non-injurious to the battery.

The above mentioned general objects of my invention, together with others inherent in the same, are attained by the mechanism illustrated in the following drawings, the same being preferred exemplary forms of embodiment of my invention, throughout which drawings like reference numerals indicate like parts:

Figure 1 is a view in front elevation of a propeller blade provided with the control mechanism of my invention shown in dotted line as the same is on the back side;

Fig. 2 is a view in edge elevation of the propeller embodying my invention;

Fig. 3 is a view of the back side of the propeller blade embodying my invention;

Fig. 4 is a view of a control mechanism embodying my invention in closed position;

Fig. 5 is a view of the control mechanism of my invention in open position;

Fig. 6 is a view of a modified form of my invention; and

Fig. 7 is a view in cross section on dotted line 7—7 of Fig. 6.

A propeller 10 having blades 11 and 12 of my invention is provided with a control mechanism 13 identical for each blade. This comprises a plate 14 hingedly mounted by pin 15 to hinge member 16 secured to the blade 11 by rivet means 17 or otherwise. My invention will be described with respect to blade 11, it being understood that the same description applies to blade 12. Plate 14 is held closed by resilient or spring means 18. This spring 18 is mounted upon a link 19 having heads 20 and 21. Spring 18 bears on one end against head 21 and against a washer 22 slidably carried on link 19. The plate 14 has an opening 25 (preferably of slot form although obviously it may be of round form if sufficiently large). The plate 14 has a slightly bent outward edge portion 23 to make an opening 24 between the blade 11 and the plate 14. The link 19 passes through opening 26 (preferably of slot form although obviously the opening may be round if sufficiently large) in the blade 11 to permit free and angular operation of the link and the spring mounted thereon in connection with the hinged plate 14.

In the modified form of my invention Figs. 6 and 7, a plate 27 is hingedly mounted on pin 28 to plate mounting means 29 secured to following edge portion of blade 30. On pin 28 is secured resilient means 31, preferably on each end thereof. This spring bears on plate 27 and mounting means 29 thereby urging plate 27 against the leading edge of the blade 30. Mounting means 29 has turned up means 32 to act as a stop for the plate 27 to allow it to open to a predetermined extent.

The mode of operation of the blade embodying my invention is as follows: On the leading edge of each of the blades 11 and 12 of a propeller 10 (preferably on each blade to provide balance) is mounted the braking or controlling mechanism of my invention. The plate 14 preferably extends slightly beyond the leading edge and is slightly bent backward as respects edge portion 23 in order to facilitate the building up of a pressure on the plate 14 to throw open the plate 14 against the action of the spring 18. It is manifest that the degree of angular opening of plate 14 with respect to the blade 11 depends directly upon and is proportionately responsive to the amount of air pressure against plate 14. In turn the magnitude of this pressure is dependent upon the velocity of the propeller 10 and this in turn is dependent upon the wind velocity impinging upon the propeller 10. Accordingly, the resiliently mounted control or braking mechanism of my invention is mounted upon the leading edge of a blade 11 of a propeller and its operation is directly and proportionately responsive to the velocity of the wind striking the same.

My invention is characterized by its simplicity of construction and therefore reliability in operation as there is nothing requiring routine attention. Even routine matters such as lubrication are avoided by my invention, and the same is capable of rugged construction so as to be operable under extreme conditions. Actual operation in sleet and snow has proven the device of my invention to be free of objectionable interference.

The mode of operation of the modified form of the device embodying my invention is in general similar to the form first described herein. The link 19 is omitted and no opening 26 is made in the blade 30. The resilient means 31 operates to urge the plate 27 against the leading edge as does spring 18. The stop 32 limits the opening of the plate 27, thus performing the function of link 19 in the respect of the first form of my invention described herein.

Obviously, changes may be made in the forms, dimensions, and arrangement of the parts of my invention, without departing from the principle thereof, the above setting forth only preferred forms of embodiment.

I claim:

1. In combination with a propeller blade, a plate member hingedly connected to the following edge portion and protruding beyond the leading portion of the blade, disposed on the high pressure surface thereof, and having its free end portion directed toward the leading edge portion of the blade and shaped to provide an air space between its free end portion and the leading edge portion of the blade, whereby air passing the blade will enter said air space and tend to angularly move the plate member away from said blade; and resilient means carried by said plate member and said blade and urging said plate member toward said blade.

2. In combination with a propeller blade, a plate member hingedly connected to the following edge portion of the blade, disposed on the high pressure surface thereof, and having its free end portion directed toward and turned outwardly from the leading edge portion of the blade normally providing an air space between its free end portion and the leading edge portion of the blade, whereby air passing the blade will enter said air space and tend to angularly move the plate member away from said blade; and resilient means carried by said plate member and said blade and urging said plate member toward said blade.

3. In combination with a propeller blade having an opening therein, a plate member, having a slot therein, hingedly connected to the following edge portion of the blade and having its free end portion directed toward and initially spaced from the leading edge portion of the blade to provide an air space between its free end portion and the leading edge portion of the blade, whereby air passing the blade will enter said air space and tend to angularly move the plate member away from the blade; and resilient means urging said plate member toward said blade, said resilient means comprising a link passing through the said opening in the blade and through the slot in said plate, said link member having a head on each end thereof, a washer slidably mounted on said link, and resilient means mounted on said link bearing against one head of said link and against said washer.

4. In combination with a propeller blade having an opening therein, a plate member, having a slot therein, hingedly connected to the following edge portion of the blade and having its free end portion directed toward and initially spaced from the leading edge portion of the blade to provide an air space between its free end portion and the leading edge portion of the blade, whereby air passing the blade will enter said air space and tend to angularly move the plate member away from the blade; and resilient means urging said plate member toward said blade, said resilient means comprising a link passing through the said opening in the blade and through said slot in the plate member, said link having a fixed head member on one end and an adjustable nut on the other, a washer slidably mounted on said link, and resilient means mounted on said link bearing against said adjustable nut of said link and against said washer.

5. In combination with a propeller blade, a plate member hingedly connected to the following edge portion of the blade and having its free end portion directed toward and initially spaced from the leading edge portion of the blade to provide an air space between its free end portion and the leading edge portion of the blade, whereby air passing the blade will enter said air space and tend to angularly move the plate member away from said blade; and resilient means urging said plate member toward said blade, said resilient means comprising a pin hingedly connected with said plate member, and resilient means mounted on said pin, abutting said blade, and urging said plate toward the blade.

ALVIN OSTERBACK.

REFERENCES CITED

The following references are of record in the file of this patent:

UNITED STATES PATENTS

| Number | Name | Date |
|---|---|---|
| 1,786,057 | Fales | Dec. 23, 1930 |
| 2,058,500 | Plucker | Oct. 27, 1936 |
| 2,196,573 | Wiste | Apr. 9, 1940 |

FOREIGN PATENTS

| Number | Country | Date |
|---|---|---|
| 244,385 | Great Britain | Dec. 17, 1925 |